United States Patent [19]

Saito et al.

[11] 4,174,425
[45] Nov. 13, 1979

[54] PROCESS OF PREPARING STYRENIC POLYMER FOAMS

[75] Inventors: Fumio Saito, Ohtsu; Fumito Yamai, Kusatsu; Yositugu Beppu, Shiga; Shinpei Nakayama, Kusatsu, all of Japan

[73] Assignees: Sekisui Kasehin Kogyo Kabushiki Kaisha, Nara; Sekisui Kagaku Kogyo Kabushiki Kaisha, Osaka, both of Japan

[21] Appl. No.: 868,591

[22] Filed: Jan. 11, 1978

Related U.S. Application Data

[60] Division of Ser. No. 596,785, Jul. 17, 1975, Pat. No. 4,091,054, which is a continuation-in-part of Ser. No. 381,459, Jul. 23, 1973, abandoned.

[51] Int. Cl.$^2$ ............................................. C08J 9/02
[52] U.S. Cl. ..................................... 521/56; 521/146; 521/147; 526/200; 526/206; 526/207; 526/201; 526/209; 526/210
[58] Field of Search ............... 260/886; 526/329, 346; 521/56, 146, 147

[56] References Cited

U.S. PATENT DOCUMENTS

| | | | |
|---|---|---|---|
| 2,888,410 | 5/1959 | Buchholz | 260/885 |
| 2,934,530 | 4/1960 | Ballast | 526/346 |
| 3,265,643 | 8/1966 | Hatano | 526/91 |
| 3,423,351 | 1/1969 | Pierce | 526/346 |
| 3,440,219 | 4/1969 | Wolff | 260/29.6 |
| 3,468,820 | 9/1969 | Buchholz | 260/885 |
| 3,696,172 | 10/1972 | Kaiho | 260/880 R |
| 3,736,273 | 5/1973 | Hatano | 260/2.5 B |
| 3,960,787 | 6/1976 | Isukamoto | 260/2.5 HB |

Primary Examiner—C. A. Henderson
Attorney, Agent, or Firm—Sughrue, Rothwell, Mion, Zinn and Macpeak

[57] ABSTRACT

In a suspension polymerization process of preparing styrenic polymer particles from a styrenic monomer and small particles of a styrenic polymer in a definite particle size range, styrenic polymer particles having a uniform particle size are obtained without the formation of fine polymer powders by simultaneously but separately dropwise adding to an aqueous suspension of the small particles of the styrenic polymer (1) a solution of 100-60% by weight of a suspension polymerization catalyst and 1-10% by weight of the styrenic monomer and (2) a solution of 0-40% by weight of the catalyst and 99-90% by weight of the styrenic monomer simultaneously but separately from each other.

14 Claims, No Drawings

PROCESS OF PREPARING STYRENIC POLYMER FOAMS

CROSS-REFERENCE TO RELATED APPLICATION

This is a Division of application Ser. No. 596,785, filed July 17, 1975 now U.S. Pat. No. 4,091,054 in turn a CIP application of Ser. No. 381,459, filed July 23, 1973, now abandoned.

BACKGROUND OF THE INVENTION

1. Field of the Invention

The present invention relates generally to a novel process of producing styrenic polymers and more particularly the invention relates to a suspension polymerization process of producing styrenic polymer particles having a uniform particle size or of producing foamable styrenic polymer particles having a uniform particle size.

2. Description of the Prior Art

Styrene polymers are conventionally prepared by known processes such as emulsion polymerization and suspension polymerization. And the suspension polymerization process should be utilized when it is desired to obtain polymers in particulate form as the immediate product. However, as it has been very difficult to obtain those of uniform or predetermined size by conventional process we have had to seive the resulting polymer particles in a desired size range. Among the polymer particles seived off, smaller ones could be further polymerized to obtain predetermined, large particle of uniform size, as proposed in British Pat. No. 1,255,237 in the name of Sekisui Kagaku Kogyo K.K.

British Pat. No. 1,255,237 discloses a suspension polymerization process for obtaining styrenic polymer particles having a large and uniform particle size by dispersing polymer particles prepared by known processes having a small and uniform particle size into an aqueous suspension solution containing a dispersing agent, adding thereto a monomer containing a polymerization catalyst while stirring thereby absorbing the monomer into the polymer particles which are nuclei in the suspension system with the polymerization proceeding in the interior of the particles.

According to the above method, the polymerization catalyst is added to a dispersion system where the polymer particles are suspended therein after uniformly dissolving the polymerization catalyst into the system all of the monomer used. In such a case, the disclosure is that the monomer is added to the dispersion system continuously or intermittently in an amount not exceeding 1.5 times of the monomer in the dispersion system to the polymer in the dispersion system. By this method styrenic polymer particles having a far more uniform particle size as compared with that obtained in a conventional suspension polymerization method can be obtained, but a problem still remains in that the powdery polymer particles which pass through a 32 mesh sieve (a large portion is fine powdery polymer particles having a particle size of not more than 0.2 mm) are byproduced in an amount of 2 to 3% by weight. Such fine powdery polymer particles have no utilitarian value since the degree of polymerization is very low and impurities such as suspending agent are contained therein. Further, the recovery of these particles during production is difficult and waste water is contaminated therewith. Thus, problems of an increase in the cost due to the need for waste water treatment facilities occur and, if recovered, a problem in disposal of the particles results. Therefore, as the industrial production amount is so great, reduction in the amount of powdery polymer particles formed to a degree of 0.5 to 1.0% by weight brings about a big economical advantage. Further industrial waste materials can also reduced.

As mentioned before, in the method hithertofore reported, the approach is to merely dissolve all of the catalyst in all of the monomer and to add the resulting mixture to a dispersion system. In employing this method the formation of powdery polymer particles cannot be reduced to less than 1% by weight. Further, other conventional techniques, e.g., adding all of the catalyst and then adding the monomer, or adding all of the monomer and then adding the catalyst, also, does not prevent the formation of fine powdery polymer particles. For the reasons above, an improved suspension polymerization method in which the formation of fine powdery polymer particles is prevented and polymer particles having a uniform particle size can be obtained has hithertofore been strongly desired.

SUMMARY OF THE INVENTION

A main object of the present invention is to use a suspension polymerization method and by dispersing polymer particles having a small particle size into an aqueous suspension solution containing a dispersing agent, adding thereto a monomer solution containing a catalyst and conducting the polymerization in the particles while absorbing the monomer into the polymer particles, to prevent the formation of fine powdery particles thereby to obtain styrenic polymer particles having a uniform particle size in a yeild of more than 99% by weight.

The process according to the present invention provides foamable styrenic polymer particles having a very uniform particle size by the use of a foaming agent as compared with a process of adding a foaming agent to the conventional suspension polymerization process.

Another object of the present invention is to obtain, in a far more uniform particle size range, styrenic polymer particles or foamable styrenic polymer particles having an enlarged particle size of 0.4 to 3 mm, preferably 0.6 to 2.5 mm, using styrenic polymer particles having a particle size 0.2 to 1.8 mm.

It has now been found that, in order to prevent the formation of fine powdery polymer particles, the conventional manner of merely dissolving a catalyst in all of the monomer and then adding the resulting mixture to a dispersion system is not suitable, and in the case of suspending small particles of a styrenic polyemr in water and conducting the polymerization in the presence of a suspension polymerization catalyst while dropwise adding to the suspension a styrenic monomer, the formation of such fine-powdery polymer can be prevented by simultaneously but separately dropwise adding: (1) a solution comprising a small portion of the styrenic monomer and a large portion of the polymerization catalyst; and (2) a solution comprising the remaining (large) portion of the styrenic monomer and the remaining (small) portion of the polymerization catalyst in such a manner that the above solutions (1) and (2) are not directly brought into contact with each other, i.e., are not pre-mixed.

Further, the present invention effectively prevents the formation of fine powdery polymer particles by adding a surface active agent soluble in the styrenic monomer to the solutions (1) and/or (2) above.

Furthermore, the present invention provides an excellent suspension polymerization process in which it is possible to further improve the effect of preventing the formation of powdery polymer particles by emulsifying solution (1) above and an aqueous solution containing an emulsifying agent and a dispersing agent and adding the emulsion to the dispersion system in the same manner as described above.

DETAILED DESCRIPTION OF THE INVENTION

That is, according to the present invention there is provided a suspension polymerization process for preparing styrenic polymer particles from styrenic monomer and styrenic polymer particles by suspending the polymer particles having particle sizes of 0.2 to 1.8 (hereinafter referred to as a definite particle size range) in water and conducting the polymerization while adding dropwise thereto the styrenic monomer and a suspension polymerization catalyst, which comprises simultaneously but separately dropwise adding to the suspension a solution comprising 100 to 60% by weight of the suspension polymerization catalyst and 1 to 10% by weight of the styrenic monomer used (hereinafter referred to as the "polymerization catalyst solution") and a solution comprising 0 to 40% by weight of the suspension polymerization catalyst and 99 to 90% by weight of the styrenic monomer used (hereinafter referred to as the "monomer solution"), in such a manner that the polymerization catalyst solution and the monomer solution are not directly brought into contact with each other, i.e., are not pre-mixed.

The styrene monomers and styrene polymers used as raw materials in the present invention are not, of course, limited to a monomer of styrene per se or a homopolymer of styrene per se, respectively, though practically speaking, using styrene monomer and polystyrene per se are a most preferred embodiment of the present invention.

On the contrary, not only are homopolymers of styrenes such as styrene per se, o-methylstyrene, m-methylstyrene, p-methylstyrene, ethylstyrene, α-methylstyrene, p-chlorostyrene, 2,4-dichlorostyrene and the like useful, but mixtures of such materials and copolymers thereof with a different copolymerizable monomer can be used as monomer/polymer raw materials.

Typical of such different copolymerizable monomers are ethylenically unsaturated monomers copolymerizable with the styrene material, e.g., ester monomers comprising an alkyl alcohol having from 1 to 12 carbon atoms (polyalcohols are not used) and an acid monomer.

Specific examples of such different copolymerizable monomers are acrylic esters such as methylacrylate, ethylacrylate, butylacrylate, etc., methacrylic esters such as methylmethacrylate, ethylmethacrylate, etc., maleic esters such as dimethylmaleate, diethylmaleate, dibutylmaleate, etc., fumaric esters such as dimethylfumarate, diethylfumarate, etc., acrylonitrile and the like.

Phrased differently, the monomer copolymerized with the styrene of the present invention can be freely selected from those known in the art as modifiers for polystyrene. In a similar manner, the different types of styrene materials heretofore recited can be freely blended to obtain the optimum characteristics of different types of styrene materials, for instance, styrene per se and α-methylstyrene can be used as a monomer mixture or in polymer form and as the monomer and polymer particle raw materials, respectively.

However, as one replaces increasing amounts of the styrenic material with a different copolymerizable monomer, one obviously begins to depart further and further from the essential characteristics of the styrenic materials. The basic purpose of using the different copolymerizable monomers is, of course, to alter the characteristics of the product obtained from those of the styrenic materials per se. Generally speaking, seldom would one use any non-styrenic material in an amount greater than 50 weight % in the monomer or polymer particle starting materials since in this case one would essentially be trending away from a styrene product to a product where the different copolymerizable monomer properties are emphasized. In fact, generally speaking, no more than 40 weight % of a different copolymerizable monomer (other than the styrenic materials) will be used in the styrene monomer or styrene polymer particle raw materials, though if used they will be used in amount greater 1 weight %.

The general trend will also be to use the more reactive styrenic materials, e.g., the chlorostyrenes are very poor in reactivity, and generally will not be used on an industrial scale.

Furthermore, the product of the present invention can include other components or monomers which have a small cross-linking activity, such as divinyl benzene, polyethylene glycol dimethacrylate and the like. However, with such materials generally very small proportions are used in light of their cross-linking activity. Typically, on the order 0.02 to 5 weight % will be used, based on the product weight.

Summarizing the above, it will be seen by one skilled in the art that the present invention is not limited to a homopolymer of styrene per se but includes homopolymers of ether styrenic materials, polymers formed from mixtures thereof and, in fact, copolymers or even terpolymers formed of a styrenic material(s) and another different monomer or monomers copolymerizable therewith. Nevertheless, it must be kept in mind that the present invention is directed to the formation of a polystyrene, and generally, as lesser and lesser amounts of styrenic materials are present in the final product, the further will be the deviation from the desirable properties of the polystyrenes.

In the following discussion, the terms "styrene monomer" or "styrenic polymer" or like terminology used to describe the raw materials refer to all such homopolymers, copolymers or terpolymers. In the specific working examples, however, styrene or polystyrene per se is meant, unless otherwise indicated.

With respect to the particle sizes of the styrenic polymer used as a part of the raw materials in the process of this invention, the polymer particles must have a uniform particle size or definite particle sizes and further the size of the polymer particles must be smaller than the size of the styrenic polymer particles to be prepared according to the process of this invention. As mentioned above, when a styrenic monomer is polymerized by a conventional suspension polymerization process, the formation of styrenic polymer particles having particle sizes smaller than about 0.6 mm together with large polymer particles is inevitable, and such small polymer particles are suitable as the styrenic polymer particles to be used as one component of the raw materials in the process of this invention, and by using the small polymer particles, styrenic polymer particles having a desired particle size can be produced at a yield of almost 100 percent.

The reason why styrenic polymer particles having uniform particle sizes are required as one component of the raw materials in the process of this invention is as follows: in the case of preparing the styrenic polymer particles by the process of this invention, polymer particles having a uniform particle size as indicated above give styrenic resin particles having a uniform particle size, while polymer particles having uneven particle sizes give styrenic resin particles having uneven particle sizes.

The uniformity of the particle sizes of the styrenic polymer particles employed as one component of the raw materials in the process of this invention is preferably defined by the following standard. That is, when, in case of sieving the polymer particles, the particle size of the larger polymer particles is designated as $d_{max}$, and the particle size of the smaller polymer particles is designated as $d_{min}$, and $d_{max} = n \times d_{min}$, cases satisfying the relationship $1 < n \leq 3$ are preferred, and cases satisfying the relationship $1 < n \leq 1.5$ are particularly preferred.

Styrene particles having a polymerization degree of about 800 to about 3,000 are generally used on a commercial scale. However, this is non-limitative since in a laboratory scale those having a polymerization degree of up to about 20,000 can be used.

The amount of styrene polymers used is 5 to 60 wt % of the polymer particles produced and that of styrene monomers used is 95 to 40 wt % of the polymer particles produced. Accordingly, the particle size of the polymer raw material is preferably about 0.2 to about 1.8 mm (calculated value).

The particle sizes of the styrenic polymer particles used as one component of the raw materials in the process of this invention will now be further explained in detail. The particle sizes of the styrenic polymer particles obtained by the process of this invention are determined by the particle sizes of the styrenic polymer particles used as one component of the raw materials, and the amount of the styrenic monomer used as the other component of the raw materials. For example, if it is desired to produce styrenic polymer particles having large particle sizes using styrenic polymer particles having small particle sizes as one component of the raw materials, the polymerization can be conducted by using a large amount of the styrenic monomer. On the other hand, if it is desired to produce styrenic polymer particles having not so large particle sizes from the same polymer particles, the polymerization can be conducted using a reduced amount of the styrenic monomer. More practically speaking, in the case of producing styrenic polymer particles having a uniform particle size in the range of about 0.85 to 1.1 mm using styrenic polymer particles having particle sizes of 0.4 to 0.5 mm as one component of the raw materials in the process of this invention, 90 parts of the styrenic monomer can be used per 10 parts by weight of the aforesaid polymer particles as the raw material, and if it is desired to produce styrenic polymer particles of a 0.6 to 0.8 mm particle size using the same raw material, 65 parts by weight of the styrenic monomer can be used per 35 parts by weight of the raw material polymer particles.

Accordingly, almost all samll styrenic polymer particles, the use of which is greatly restricted in conventional processes, can be used as the raw material for producing styrenic polymer particles having desired particle sizes if they are further sieved into polymer particles having particle sizes in the desired particle size range.

As mentioned above, a catalyst is used in the process of this invention.

The catalysts used in the process of the present invention must be insoluble in water and soluble in the styrenic monomer. Materials generally well known as a polymerization initiator for a styrenic monomer can be used as catalysts. As such catalysts providing free-radicals, peroxides or azo-type polymerization catalysts are usually used. Examples of such catalysts are organic peroxides as such benzoyl peroxide, lauroyl peroxide, tert-butyl peroxybenzoate, tert-butylperoxypivalate, and the like, and azo compounds such as azobisisobutyronitrile, azobisdimethylvaleronitrile and the like. These catalysts can be used individually or as a mixture of two or more thereof.

In the process of this invention, 60 to 100% by weight of the suspension polymerization catalyst used is dissolved in 1 to 10% by weight of the styrenic monomer used to provide the polymerization catalyst solution, and the remaining catalyst is dissolved in 99 to 90% by weight of the styrenic monomer used to provide the monomer solution. The catalyst solution and the monomer solution are simultaneously but separately dropwise added to an aqueous suspension of the small particles of the styrenic polymer selected, such that the small particles might not stick each other. By dropwise adding the polymerization catalyst solution and the monomer solution separately to the suspension of the polymer particles in the above-mentioned manner, the polymerization does not significantly proceed in the monomer solution, even if the monomer solution is present as oil drops in the aqueous suspension of the small particles of the styrenic polymer. This is because the suspension polymerization catalyst is not present or is present in a very low amount as compared with the amount of the styrenic monomer in the added monomer solution, and thus the oil drops of the monomer solution in the suspension are completely absorbed by the small polymer particles with the passage of time.

On the other hand, even if the polymerization proceeds in the polymerization catalyst solution as oil droplets in the aqueous suspension of the polymer particles, the amount of the styrenic monomer polymerized is as low as 1 to 10% by weight, and further, as described above, a large portion of the monomer solution containing the catalyst as oil droplets is absorbed as nuclei by the small particles of polymer suspended in water. Accordingly, the formation of powdery polymer in the suspension polymerization is quite low.

In the present invention, 100 to 60% by weight of the suspension polymerization catalyst used is dissolved in 1 to 10% by weight of the styrenic monomer used, but a solvent which does not hinder the polymerization reaction can also be used. Examples of such solvents are toluene, benzene, cyclohexane, 1,2-dichloropropane, and the like. The reason why the solvent is added to the reaction system is that on adding a foaming agent to the styrenic polymer particles and then expanding them by heating, the particles are softened by the addition of the solvent prior to expanding. By this treatment, the heating time can be shortened. In the case of a molding procedure, the same reasons also are applicable. The solvent can, in fact, by used for both solutions, and the amount of the solvent is generally 0.2 to 5 wt % of the polymer particles.

In the process of this invention, if the amount of the styrenic monomer used for preparing the polymerization catalyst solution is less than 1% by weight, the amount of the suspension polymerization catalyst becomes too large as compared with the content of the styrenic monomer, and the catalyst will be undesirably released into the aqueous suspension. On the other hand, if the content of the styrenic monomer in the catalyst solution is higher than 10% by weight, the amount of the monomer present as oil droplets in the aqueous suspension, and thus the amount of the powdery polymer formed, becomes undesirably large.

Also, the amount of the suspension polymerization catalyst used in the polymerization catalyst solution in the process of this invention is 100 to 60% by weight of the total suspension polymerization catalyst. If the amount of the suspension polymerization catalyst is less than 60% by weight, the content of the catalyst in the monomer solution becomes large and the polymerization proceeds in the oil droplets of the monomer solution which causes the undesirable result that the formation of the powdery polymer becomes great.

In the process of this invention, it is most preferred that the total amount of the suspension polymerization catalyst used be dissolved in 1 to 10% by weight of the styrenic monomer.

As mentioned before, the polymerization catalyst solution and the monomer solution are simultaneously added from separate inlets. The addition rate of the two solution to the dispersion system is naturally restricted to some degree. That is, if all of the monomer solution is added in a short period of time (e.g., within 1 hr.), since the rate for absorption of the monomer in the polymer as a nucleus is limited, the polymerization proceeds with a large amount of monomer not being absorbed whereby a large amount of powdery polymers is by-produced and the nuclei polymers stick each other because of the solvent action of the monomer. This is not preferred. Therefore, the monomer must be added to the dispersion system in an amount such that the amount of monomer does not exceed 35% by weight of the total amount of polymers (including polymers converted from monomers) and monomers in the dispersion system. To achieve the above aspect, it is desirable to add in such that the rate of the monomer absorbed in particles for conversion into polymer is equal to or smaller than the rate of the monomer added.

It is impossible to set forth the exact period of time for adding the monomer to the dispersion system since the reaction rate of the monomer absorbed in the particles varies depending upon the amount of catalyst used and the reaction temperature, but all of the monomer is generally added over a time period exceeding 2 hours.

The addition time is also greatly dependent upon the ratio between the polymer as a nucleus used as a starting material and the monomer used. For example, in conducting the polymerization while adding 10 parts of polymer and 90 parts of monomer and absorbing the monomer in the polymer particles, the addition is generally conducted over a period of 6 to 10 hours. Further, in using 50 parts of polymer and 50 parts of monomer, the addition of the monomer is conducted over a period of 1 to 2 hours.

As mentioned before, the polymerization catalyst solution and the monomer solution must be simultaneously added through separate inlets. If all the polymerization catalyst solution is first added and then the monomer solution is added over a long period of time, the catalyst does not act sufficiently on the monomer added whereby the polymerization is greatly retarded and no effect in preventing the formation of powdery particles is observed. This manner is not preferred. Further, adding all of the monomer solution and then adding the polymerization catalyst solution or adding the polymerization catalyst solution and the monomer solution simultaneously over a short peirod of time are also not preferred, since, due to the presence of a large amount of monomer in the dispersion system, the polymerization is initiated without the monomer absorbing in the polymer particles, as a result a large amount of powdery polymer particles are formed. Therefore, as employed in the process of the present invention it is necessary to simultaneously add the polymerization catalyst solution and the monomer solution in such that the addition is nearly equal to the rate of the monomers which absorb in the polymer particles and are converted into the polymer in the dispersion system from separate inlets over a several hour period. By employing the above technique, the formation of fine powdery polymer particles can be effectively prevented.

As a suspending agent employed in the process of this invention, a water-soluble high molecular weight material such as polyvinyl alcohol, methyl cellulose, etc., or a slightly soluble inorganic material such as calcium phosphate, magnesium pyrophosphate, etc., can be used.

In the case of producing foamable styrenic polymer particles by a second embodiment of the process of this invention, it is necessary to use a foaming agent. As the foaming agent there is used one having the property of not dissolving the styrenic polymer but at most only slightly swelling the styrenic polymer (when the polymers are impregnated with a true swelling agent, the polymers per se undergo a volume expansion), having a boiling point lower than the softening point of the aforesaid styrenic polymer, and which is in the gaseous state or liquid state at normal conditions. Aliphatic or cycloaliphatic hydrocarbons or halogenated hydrocarbons generally used in the art can be used as such a foaming agent. Examples of such foaming agents are aliphatic hydrocarbons such as propane, butane, pentane, propylene, isobutane, butylene, cis-butylene, trans-butylene, neo-pentane, isopentane, pentene-1, hexane, hexane-1, etc., cycloaliphatic hydrocarbons such as cyclobutane, cyclopentane, etc., and halogenated hydrocarbons such as methyl chloride, dichlorodifluoromethane, dichlorodifluoroethane, ethyl chloride, vinyl chloride, methylene chloride, dichlorofluoromethane, trichlorofluoromethane, chlorodifluoromethane, trichlorofluoromethane, propyl chloride, etc. Feeding of a gaseous foaming agent is conducted at a higher pressure than the polymerization pressure.

The foaming agent can be added to the styrenic monomer before, during, or after the polymerization of the styrenic monomer.

In the process of this invention, the formation of a fine powdery polymer can further be improved by incorporating a surface active agent which is soluble in the styrenic monomer into the styrenic polymer (the oil-soluble surface active agent is incorporated into the polymers together with the monomers, but it is not added to nor incorporated into the polymers alone) so as to form fine oil droplets of the monomer solution and/or the polymerization catalyst solution, thereby increasing the absorption of the above solutions by the polymer particles which have been suspended in the polymerization system.

The surface active agent used in the present invention is not used to increase the suspension effect of the polymer particles in the suspension solution as conventionally known, but is used to decrease the surface tension so that the monomer added is easily absorbed in the polymer, and even if the surface active agent contained in the monomer is amphoteric, it does not immediately diffuse into the suspension solution and has an effect of decreasing the surface tension until absorbing in the polymer. That is, the surface tension of the oil droplets can be decreased by incorporating an oil-soluble surface active agent into the polymerization catalyst solution and/or the monomer solution, whereby the oil droplets tend to be absorbed more easily by the polymer particles due to the increase in the surface area and in the number of oil droplets. Thus, the formation of fine powdery polymer can be reduced remarkably.

As the surface active agent soluble in the styrenic monomer and used for the above purpose, a surface active agent which hinders the polymerization of the monomer or which has a high activity as a chain transfer agent for the polymerization is undesirable, but other surface active agents soluble in the styrenic monomer can all be used in this invention. Examples of surface active agents used in this invention are polyoxyethylene alkyl ether compounds such as tetraoxyethylene oleyl alcohol ether, polyoxyethylene alkylphenol ether compounds such as tetraoxyethylene nonyl phenol, polyoxyethylene fatty acid ester compounds such as dioxyethylene oleic acid ester, pentaerythritol fatty acid ester compounds such as pentaerythritol dioleic acid ester, trimethylolpropane fatty acid ester compounds such as trimethylolpropane monooleic acid ester, sorbitan fatty acid ester compounds such as sorbitan trioleic acid ester, sorbitan fatty acid ester-polyoxyethylene ether compounds such as sorbitan monolauric acid ester-polyoxyethylene ether, polyoxyethylene alkylamide compounds such as polyoxyethylene stearylamide, and the like.

The amount of the surface active agent soluble in the styrenic monomer used in the process of this invention is 0.0025 to 2% by weight based on the weight of the styrenic monomer used. If the amount of the surface active agent is more than 2% by weight, although the effect of preventing the formation of the fine-powdery styrenic polymer continues, excessive surfact active agent migrates to the surfaces of the styrenic polymer particles formed, and since the surface active agent is tacky, the polymer particles stick to each other to form larger polymer particles than the desired sizes, which is undesirable in the process of this invention.

In a further preferred embodiment of the present invention, the formation of fine-powdery polymer can be prevented more effectively by stirring the polymerization catalyst solution containing the above surface active agent using a high speed stirrer to form a micronized suspension (e.g., micronization into about 100 microns gives excellent results). Furthermore, the polymerization catalyst solution can be an emulsion containing fine oil droplets prepared by adding an emulsifier such as a water-soluble surface active agent and water in place of the oil-soluble surface active agent used above and stirring the resulting polymerization catalyst solution using a high speed stirrer. More specifically, the polymerization catalyst solution is first mechanically stirred in the presence of an oil-soluble surface active agent or an emulsifier such as a water-soluble surface active agent and water to produce a suspension or an emulsion containing fine oil droplets, and the resulting micronized polymerization catalyst solution is then added dropwise to the suspension containing suspended polymer particles so that the fine droplets of the polymerization catalyst solution can easily be absorbed by the polymer particles because of the increased surface area of the oil droplets in the polymerization catalyst solution due to micronization. In addition, since the frequency of contact of polymer particles with oil droplets increases as the number of the oil droplets increases, the oil droplets become absorbed more rapidly. In this manner, the absorption efficiency of the oil droplets by the polymerization catalyst solution can be promoted and the formation of a fine powdery polymer can remarkably be reduced.

Examples of emulsifiers suitable for the above purpose include water-soluble anionic surface active agents such as sodium oleate, sodium dodecylbenzenesulfonate, and the like, nonionic surface active agents such as a polyoxyethylene sorbitan monolauric ester, and the like, and water-soluble organic high molecular weight compounds such as hydroxycellulose, polyvinylpyrrolidone, and the like.

When the water-soluble surface active agent is used, the amount thereof is about 0.01 to about 1% based on the amount of water used. Furthermore, the amount of water used is 0.7 to 5 times, preferably 0.8 to 2 times, the amount of polymerization catalyst solution used.

From the above discussion, it will be apparent to one skilled in the art that the parameter of separate dropwise addition is the most important in the present invention. Accordingly, other process parameters can be relatively freely varied and balanced by one skilled in the art. Though non-limitative, highly preferred process conditions are as follows:

The amount of styrene polymer(s) is 5 to 60 wt % of the polymer particles produced; the amount of styrene monomer(s) is 95 to 40 wt % of the polymer particles produced; the amount of water used is 0.5 to 5 times, preferably 0.8 to 2 times, the weight amount of polymer particles produced; the amount of catalyst is 0.05 to 2 wt %, preferably 0.1 to 1 wt %, of the total monomers used; the amount of suspending agent is 0.05 to 3 wt %, preferably 0.2 to 1 wt %, of the amount of water used; and the amount of foaming agent is 2 to 20 wt %, preferably 3 to 12 wt %, of the polymer particles produced. When a styrene copolymer is used, the same percentages as above apply, i.e., the amount of styrene copolymer would be 5 to 60 wt % of the polymer particle produced, etc.

With the excellent results obtainable within these ranges, little need will exist to vary therefrom.

The reaction temperature and time change depending upon the amount of catalyst(s) used, kind(s) of catalysts and the quantitative relationship of polymers and monomers. Generally, temperatures and times as are used in prior art styrene polymerizations are used. These factors are not overly critical and can be appropriately chosen by one skilled in the art. During monomer addition, the reaction is preferably conducted at normal pressure, but it can be conducted at elevated pressure, for example, 0 to 25 kg/cm$^2$ (gauge), if desired.

The catalysts heretofore discussed are generally used singly, but may be used in combination. Similarly, with reference to the solvents, suspending agents and foaming agents, mixtures thereof can also be used. In the case of the suspending agents, examples of such mixtures are a mixture of polyvinyl alcohol and methylcellulose, a mixture of calcium phosphate and magnesium phosphate, a mixture of calcium phosphate and polyvinyl alcohol, and the like.

Conventional surface active agents and suspending agents, in general, can be used in the present invention, so any discussion above regarding such limitations should not be construed as limitative.

The invention will now be described in more detail by the following examples of preferred embodiments of the invention.

In the examples, the polymerization is conducted at normal pressure. However, when the polymerization is conducted at temperatures greater than 100° C., the reaction system is naturally under an elevated pressure. For example, if comonomers such as butadiene are used to obtain copolymers, the polymerization is conducted at elevated pressures of about 3 to about 5 kg/cm² (gauge) because the boiling point of butadiene is low.

EXAMPLE 1

In a 5.6 liter polymerization vessel were placed 2390 g of pure water, 9.6 g of magnesium pyrophosphate as a suspending agent, and 0.29 g of sodium dodecylbenzenesulfonate, and after suspending in the mixture 480 g of polystyrene particles having particle sizes in the range of 0.86 to 0.93 mm in diameter, the resultant suspension was stirred at a rate of 320 rpm. The molecular weight of the styrene polymer particles was about 150,000 and the average degree of polymerization was about 1,500 (same in all Examples unless otherwise indicated). Then, while maintaining the inside temperature of the polymerization vessel at 85° C., a polymerization catalyst solution prepared by dissolving 6.14 g of benzoyl peroxide in 67.3 g of styrene monomer and 1853 g of styrene monomer prepared separately therefrom were added dropwise and continuously through separate dropping inlets to the suspension under the conditions shown in the following table to cause the suspension polymerization at 85° C.

|  | Polymerization Catalyst Solution (g/hr) | Styrene Monomer (g/hr) |
|---|---|---|
| Start of dropping to two hours | 6.5 | 166.7 |
| Two hours to four hours | 12.2 | 307.8 |

-continued

|  | Polymerization Catalyst Solution (g/hr) | Styrene Monomer (g/hr) |
|---|---|---|
| Four hours to six hours | 18.0 | 452.0 |

After the additions of the styrene monomer and the polymerization catalyst solution were finished, the resulting reaction product was maintained at the same temperature for 1.5 hours so as to reach a degree of polymerization of more than 95%. After decomposing the suspending agent by adding 3.3 g of hydrochloric acid to the product, the amount of the fine-powdery polystyrene having particle sizes passed through a 32 mesh sieve (Tyler mesh) was measured. The results showed the amount of the fine-powdery polymer formed in the polymerization was only 0.80% by weight.

In addition, the amount of the styrene monomer used in the polymerization catalyst solution in this example was 3.5% by weight based on the whole styrene monomer used.

The amount of monomer added to the dispersion system was maintained 5-20% by weight of the total amount of the polymer and monomer in the dispersion system.

The produced polymer particle sizes were analized after being passed 32 mesh (Tyler mesh), and the obtained analysis was very preferable as shown below;

| Mesh (Tyler) | Weight (%) |
|---|---|
| 9 | 0 |
| 9–10 | 0.5 |
| 10–12 | 98.3 |
| 12–14 | 1.2 |
| 14 | 0 |

EXAMPLE 2

The suspension polymerization was conducted in the same manner as described in Example 1 with the exception that each of the oil-soluble surface active agents indicated in the Table below was added to the polymerization catalyst solution and/or the styrenic monomer solution, and the amount of fine-powdery polymer produced was determined in each instance. The results obtained are also shown in the Table below.

TABLE

| Oil-Soluble Surface Active Agent | Amount of Addition (g) | Weight Percent of Surface Active Agent based on Total Amount of Styrenic Monomer | | Percent Production of Fine Powdery Polymer | Note |
|---|---|---|---|---|---|
| | | Polymerization Catalyst Solution | Styrenic Monomer Solution | | |
| | 0.48 | 0.025% | 0% | 0.72% | |
| | 0.96 | 0.05 | 0 | 0.53 | |
| | 1.92 | 0.1 | 0 | 0.31 | |
| Sorbitan Trioleic | 9.6 | 0.5 | 0 | 0.26 | |
| Ester | 19.2 | 1.0 | 0 | 0.29 | |
| | 1.96 | 0 | 0.05 | 0.60 | |
| | 1.92 | 0 | 0.1 | 0.35 | |
| | 1.92 | 0.05 | 0.05 | 0.21 | |
| | 0.048 | 0 | 0.0025 | 0.67 | |
| Polyoxyethylene | 0.096 | 0 | 0.005 | 0.42 | |
| Sorbitan | 0.192 | 0 | 0.01 | 0.33 | |
| Monolauric Ester | 0.048 | 0.00125 | 0.00125 | 0.52 | |
| Trimethylol | 19.2 | 1 | 0 | 0.34 | Particles |
| Propane Monooleic | 34.5 | 1.8 | 0 | 0.28 | stuck to |

TABLE-continued

| Oil-Soluble Surface Active Agent | Amount of Addition (g) | Weight Percent of Surface Active Agent based on Total Amount of Styrenic Monomer | | Percent Production of Fine Powdery Polymer | Note |
|---|---|---|---|---|---|
| | | Polymerization Catalyst Solution | Styrenic Monomer Solution | | |
| Ester | 39.3 | 2.05 | 0 | 0.30 | each other |

It is clear from the above results that the formation of fine-powdery polymers in the suspension polymerization of this invention can remarkably be reduced by incorporating an oil-soluble surface active agent into the styrenic monomer solution and/or the polymerization catalyst solution.

EXAMPLE 3

In the same vessel as was used in Example 1 were placed 2323 g of pure water, 9.6 g of magnesium pyrophosphate, and 0.29 g of sodium dodecylbenzenesulfonate, and after adding to the mixture 480 g of small particles of polystyrene having particle sizes in the range of 0.86 to 0.93 mm in diameter, the resultant mixture was stirred at a rate of 320 rpm. Separately, 6.14 g of benzoyl peroxide was dissolved in 67.3 g of styrene monomer to provide a polymerization catalyst solution, and after adding to the solution 67.3 g of a 0.2% aqueous solution of hydroxyethyl cellulose, the mixture was finely emulsified (to about 5 to 50$\mu$) by means of a homo-mixer made by Tokushu Kikako Kabushiki Kaisha to form a polymerization catalyst suspension. Then, while continuing to maintain the suspension in the vessel prepared above at 85° C., the aforesaid suspension of the polymerization catalyst and 1853 g of styrene monomer separately prepared were added dropwise and continuously to the suspension in the vessel through separate inlets under the conditions shown below:

| | Polymerization Catalyst Suspension (g/hr) | Styrene Monomer (g/hr) |
|---|---|---|
| Start of dropping to two hours | 13.0 | 163.5 |
| Two hours to four hours | 24.4 | 307.8 |
| Four hours to six hours | 36.0 | 452.0 |

After the additions of the polymerization catalyst suspension and the styrene monomer were completed, the polymerization was further conducted for one hour and thirty minutes and then the reaction product was withdrawn from the vessel. The product was treated as in Example 1 and the amount of powdery styrenic polymer formed in the polymerization was measured. The results showed the amount was only 0.27% by weight based on the total polymer produced.

In addition, the amount of the styrene monomer used in the polymerization catalyst suspension was 3.5% by weight based on the total weight of the styrene monomer used, the value of which was same as the amount in Example 1.

EXAMPLE 4

The suspension polymerization was conducted in the same manner as described in Example 3 with the exception that polyoxyethylene laurate (Trade Name, L-2; manufactured by Nippon Oils & Fats Co., Ltd.) was added to the styrenic monomer solution in an amount of 0.1% by weight based on the total amount of the styrene monomer. In this Example, the amount of fine powdery polymer produced was found to be 0.18% by weight, based on the total polymer produced.

EXAMPLE 5

In the same vessel used in Example 1 there were placed 2280 g of pure water, 9.6 g of magnesium pyrophosphate, and 0.2 g of sodium dodecylbenzenesulfonate, and after adding to the mixture 480 g of polystyrene particles having particle sizes in the range of 0.86 to 0.93 mm in diameter, the resultant mixture was stirred at a rate of 320 rpm.

Then, 6.14 g of benzoyl peroxide and 24 g of toluene were dissolved in 96 g of styrene monomer to provide a polymerization catalyst solution and the solution was added to 120 g of 0.2% aqueous solution of a nonionic surface active agent (Polyoxyethylene monolaurylic ester; n=6) separately prepared followed by emulsification (to about 5 to 50$\mu$) by means of a homo-mixer (made by Tokushu Kikako Kabushiki Kaisha) to provide a polymerization catalyst suspension. The catalyst suspension thus-prepared and 1824 g of styrene monomer prepared separately were added dropwise and continuously to the suspension in the polymerization vessel through separate dropping inlets under the conditions shown below while maintaining the temperature inside the vessel at 85° C.

| | Polymerization Catalyst Suspension (g/hr) | Styrene Monomer (g/hr) |
|---|---|---|
| Start of dropping to two hours | 22.4 | 161.1 |
| Two hours to four hours | 42.0 | 303.2 |
| Four hours to six hours | 62.0 | 445.2 |

After the additions of the polymerization catalyst suspension and the styrene monomer were completed, the polymerization was further conducted, and kept at that condition for one hour and thirty minutes at 85° C. and then the reaction product was treated as in Example 1. The results of measurement of the amount of powdery polymer formed in the polymerization showed that the amount was only 0.35% by weight, based on the total amount of the styrene polymer produced.

In addition, the amount of the styrene monomer used in the polymerization catalyst solution was 5% by weight based on the total styrene monomer used.

Furthermore, the powdery polymer formed in the above polymerization procedure was removed and 2200 g of the polystyrene particles from the product thus-obtained was placed in a 5.6 liter pressure vessel, and then 2200 g of pure water, 8.8 g of magnesium pyrophosphate, and 0.26 g of sodium dodecylbenzenesulfonate were added to the polymer particles. Thereafter, while stirring the mixture, 110 g of propane and 110 g of butane were pressure fed into the pressure vessel as foaming agents and further, while maintaining the temperature of the liquid in the vessel at 110° C., the mixture in the vessel was stirred for 5 hours to impregnate the polystyrene particles with the foaming agent. By immersing the polymer particles thus-obtained in boiling water for 5 minutes, it was confirmed that the product was polystyrene particles capable of an expansion of 86×its original volume (by bulk).

EXAMPLE 6

In the same vessel as was used in Example 1 there were placed 2390 g of pure water, 9.6 g of magnesium pyrophosphate, and 0.29 g of sodium dodecylbenzenesulfonate, and after adding to the mixture 480 g of polystyrene particles having particle sizes in the range of 0.86 to 0.93 mm in diameter, the resultant mixture was stirred at a rate of 320 rpm.

Then, 4.14 g of benzyl peroxide was dissolved in 67.3 g of styrene monomer to provide a polymerization catalyst solution and the catalyst solution thus-prepared and a styrene monomer solution prepared by dissolving 2.0 g of benzoyl peroxide in 1853 g of styrene monomer were added dropwise and continuously to the suspension in the polymerization vessel through separate inlets to conduct the polymerization as in Example 1. Then, the reaction product was treated as in Example 1 and the amount of the powdery polystyrene formed in the polymerization procedure was measured. The results showed that the amount was 1.03% by weight, based on the total amount of the polymer produced.

In this example, 66% by weight of the polymerization catalyst, benzoyl peroxide, was dissolved in the polymerization catalyst solution and 34% by weight of the catalyst was dissolved in the styrene monomer.

EXAMPLE 7

In a 5.6 liter polymerization vessel there were placed 2230 g of pure water, 9.6 g of magnesium pyrophosphate, and 0.29 g of sodium dodecylbenzenesulfonate, and after adding to the mixture 480 g of polystyrene particles having particle sizes in the range of 0.86 to 0.93 mm in diameter, the resultant mixture was stirred at a rate of 320 rpm.

Then, 6.14 g of benzoyl peroxide was dissolved in 170 g of styrene monomer to provide a polymerization catalyst solution and the solution was added to 170 g of a 0.1% aqueous solution of sodium lauryl sulphate followed by fine emulsification (to 5 to 50μ) by means of a homo-mixer made by Tokushu Kikako Kabushiki Kaisha to provide a polymerization catalyst suspension. The catalyst suspension and 1750 g of styrene monomer prepared separately were added dropwise and continously to the suspension in the polymerization vessel through separate dropping inlets under the following conditions while maintaining the inside temperature of the polymerization vessel at 85° C.

|  | Polymerization Catalyst Suspension (g/hr) | Styrene Monomer (g/hr) |
|---|---|---|
| Start of dropping to two hours | 31.2 | 155 |
| Two hours to four hours | 58.6 | 292 |
| Four hours to six hours | 86.4 | 428 |

After the additions of the polymerization catalyst suspension and the styrene monomer were completed, 168 g of n-pentane was immediately added to the mixture in the vessel. Then, after maintaining the mixture at a constant temperature of 85° C. for one hour, the temperature of the mixture was gradually raised, and when the temperature thereof reached 110° C., the reaction was conducted for 6 hours at 110° C. Thereafter, the reaction product was cooled, withdrawn from the vessel, treated as in Example 1, and the amount of the powdery polystyrene formed was measured. The results showed that the amount was only 0.66% by weight, based on the total polymer produced.

In this example, the amount of the styrene monomer used in the polymerization catalyst solution was 8.85% by weight of the total styrene monomer used in this reaction.

When the polymer particles obtained were immersed in boiling water for 5 minutes, the polymer foamed 88× (by bulk).

EXAMPLE 8

In the same vessel as was used in Example 1 there were placed 2230 g of pure water, 9.6 g of magnesium pyrophosphate, and 0.29 g of sodium dodecylbenzenesulfonate, and after adding to the mixture 480 g of polystyrene particles having particle sizes in the range of 0.86 to 0.93 mm in diameter, the resultant mixture was stirred at a rate of 320 rpm.

Then, 6.14 g of benzoyl peroxide was dissolved in 72 g of styrene monomer to provide a polymerization catalyst solution and the catalyst solution and 1848 g of styrene monomer containing 48 g of methyl methacrylate were added dropwise and continuously to the suspension in the vessel through separate inlets under the conditions shown in the following table.

|  | Polymerization Catalyst Solution (g/hr) | Styrene Monomer (g/hr) |
|---|---|---|
| Start of dropping to two hours | 39 | 134 |
| Two hours to four hours | None | 320 |
| Four hours to six hours | None | 470 |

In the above procedure, the reaction temperature was as follows:

|  | Reaction Temperature |
|---|---|
| Start of dropping to 3 hours | 78° C. |
| 3 hours and 15 minutes to 4 hours and 30 minutes | 81° C. |
| 4 hours and 45 minutes to 6 hours | 85° C. |

After the addition of the styrene monomer was over, the polymerization was conducted for one hour and 30 minutes at 85° C. The reaction product was withdrawn from the vessel, treated as in Example 1, and the powdery polymer produced passing through a 32 mesh sieve was measured. The results showed that the amount of the powder was only 0.66% by weight, based on the total amount of the polymer produced.

As was earlier described, in order to prevent the formation of fine particles, it is extremely improtant that the polymerization catalyst solution and monomer solution be separately added dropwise. The reason why the addition of the polymerization catalyst solution was rapidly over is that all of the added catalyst did not immediately decompose and disappeared, but it gradually decomposed and took part in the reaction. The degree at which the catalyst decomposes and takes part in the reaction is influenced by the reaction temperature. That is, if the temperature is high, the catalyst, of course, rapidly decomposes, generates many radicals and then takes part in the reaction.

As observed in this example, even if the reaction of the polymerization catalyst solution is rapidly over as compared with that of the monomer solution, the catalyst gradually decomposed in the case that the reaction is conducted at low temperatures. Further, after the dropwise addition of the polymerization catalyst solution, the temperature is gradually elevated so that the catalyst generates radicals corresponding to the added monomer. In that case, even if monomer solution not containing catalyst is added relatively later, the reaction proceeds well because enough catalyst to react remains.

COMPARATIVE EXAMPLE 1

In the same polymerization vessel as was used in Example 1 there were placed 2390 g of pure water, 9.6 g of magnesium pyrophosphate, 0.29 g of sodium dodecylbenzenesulfonate, and 480 g of polystyrene particles of particle sizes in the range of 0.86 to 0.93 mm in diameter, and the mixture was stirred at a rate of 320 rpm.

Then, 6.14 g of benzoyl peroxide was dissolved in 1920 g of styrene monomer to provide a styrene monomer solution and while maintaining the reaction temperature at 85° C., the monomer solution was added dropwise and continuously to the mixture in the vessel under the conditions shown in the following table.

|  | Styrene Monomer Solution (g/hr) |
| --- | --- |
| Start of dropping to two hours | 170 |
| Two hours to four hours | 320 |
| Four hours to six hours | 470 |

After the addition of the styrene monomer solution was over, the polymerization was conducted, and kept at that condition for one hour and thirty minutes at 85° C. The reaction product was withdrawn from the vessel, treated as in Example 1, and the amount of the formed powdery polystyrene passing a 32 mesh sieve was measured. The results showed that the amount of the powder was 1.51% by weight of the total polymer produced.

As is clear from the results, when styrene monomer containing the polymerization catalyst was simply added to a suspension of the small particles of polystyrene (different from the process of this invention), the amount of the powder polymer passing a 32 mesh sieve was considerably increased.

COMPARATIVE EXAMPLE 2

In the procedure of Comparative Example 1, after the addition of the styrene monomer solution was over, 168 g of n-pentane was immediately added to the reaction mixture. Then, after stirring the mixture for one hour in the vessel, the temperature of the system was raised gradually and when the temperature reached 110° C., the reaction was conducted for 6 hours at 110° C. to provide foamable polystyrene particles. The amount of the powdery polymer formed in the reaction measured as in Example 1 was 1.44% by weight, based on the total polymer produced.

COMPARATIVE EXAMPLE 3

To a suspension maintained at 85° C. prepared in the same manner as in Example 1, a polymerization catalyst solution (1) prepared by dissolving 6.14 g of benzoyl peroxide in 67.3 g of styrene monomer was first added over a period of about 1 minute, and then 1.853 g of a styrene monomer solution (2) was added under the conditions shown below.

| Time after Polymerization Catalyst Solution Addition | Rate of Styrene Monomer Solution (2) Addition (g/hr) |
| --- | --- |
| 0 to 2 hrs. | 166.7 |
| 2 to 4 hrs. | 307.8 |
| 4 to 6 hrs. | 452.0 |

After the completion of addition of the styrene monomer solution (2), the polymerization was continued for 18 hours to complete the polymerization at 85° C. from the start of the addition of the polymerization catalyst solution (1), and then the reaction product was withdrawn from the reaction vessel. The reaction product was treated as in Example 1, and the amount of the fine-powdery polystyrene having particle sizes passing through a 32 mesh sieve (Tyler mesh) was measured. The amount passing was 1.5% by weight.

COMPARATIVE EXAMPLE 4

To a suspension as described in Comparative Example 3 above, all of the styrene monomer solution (2) as described in Comparative Example 3 above was first added over a period of about 10 minutes and stirred for 3 hours. Thereafter, all of the polymerization catalyst solution (1) as described in Comparative Example 3 above was added thereto over a 1 minute period, whereat the amount of monomer added to the dispersion system was 80% by weight of the total amount of polymers and monomers in the dispersion system.

After the addition was finished, polymerization was conducted for 6 hours, and the reaction product was withdrawn from the reaction vessel. The product was treated as in Comparative Example 3 above and the amount of fine-powdery polymers passing a 32 mesh sieve was 32.1% by weight.

COMPARATIVE EXAMPLE 5

To a suspension as described in Comparative Example 3 above, all of the polymerization catalyst solution (1) and all of the styrene monomer solution (2) as described in Comparative Example 3 above were simultaneously added over a period of about 10 minutes.

The polymerization was further conducted for 6 hours, and the reaction product was withdrawn from the reaction vessel. The product was treated as in Comparative Example 3 above and the amount of fine-powdery polymers passing a 32 mesh sieve was 41.2% by weight.

While the invention has been described in detail and with reference to specific embodiments thereof, it will be apparent to one skilled in the art that various changes and modifications can be made therein without departing from the spirit and scope thereof.

What is claimed is:

1. In a suspension polymerization process for preparing foamable styrenic polymer particles from a styrenic monomer and styrenic polymer particles having particle sizes in a definite particle size range which comprises suspending the styrenic polymer particles in water containing a surface active agent and a suspending agent selected from the group consisting of a water-soluble high molecular weight material and a slightly soluble inorganic material and adding to the aqueous suspension the styrenic monomer and a suspension polymerization catalyst to cause the polymerization, the improvement which comprises reducing the amount of powdery polymer particles which pass through a 32 mesh sieve to thereby obtain said styrenic polymer particles having a uniform particle size by adding:

(1) a polymerization catalyst suspension prepared from a polymerization catalyst solution comprising (a) 100 to 60% by weight of the suspension polymerization catalyst selected from the group consisting of organic peroxides, azo compounds and mixtures thereof and (b) 1 to 10% by weight of styrene monomer with up to 50% by weight of a different monomer copolymerizable therewith selected from the group consisting of methylacrylate, ethylacrylate, butylacrylate, methylmethacrylate, ethylmethacrylate, dimethylmaleate, diethylmaleate, acrylonitrile, α-methylstyrene, divinylbenzene and a mixture thereof having been admixed with an aqueous solution containing an emulsifying agent or a suspending agent to form a finely suspended polymerization catalyst suspension; and (2) a monomer solution comprising (a') 0 to 40% by weight of the suspension polymerization catalyst and (b') 99 to 90% by weight of styrene monomer with up to 50% by weight of a different monomer copolymerizable therewith, dropwise and simultaneous but separately from each other to the aqueous suspension of the polymer particles selected from the group consisting of styrene homopolymer and a copolymer of styrene monomer and up to 50% by weight of a different monomer copolymerizable therewith selected from the group consisting of an acrylic ester, a methacrylic ester, a maleic ester and a fumaric ester wherein the alcohol moiety is an alkyl group having 1 to 12 carbon atoms, to cause the polymerization, and conducting the polymerization in the presence of a foaming agent which does not dissolve or at most slightly swells the styrenic polymer particles produced; the amount of said styrene monomer and styrene homopolymer or copolymer being 95 to 40% by weight and 5 to 60% by weight, respectively, based on the total amount thereof; and the particle size of said styrene homopolymer or copolymer being about 0.2 to 1.8 mm.

2. The process of preparing styrenic polymer particles as claimed in claim 1, wherein said catalyst is a member selected from the group consisting of benzoyl peroxide, lauryl peroxide, tert-butyl peroxybenzoate, tert-butyl peroxypivalate, azobisisobutyronitrile, azobisdimethylvaleronitrile and a mixture thereof.

3. The process of preparing styrenic polymer particles as claimed in claim 1 wherein said aqueous solution used to form said finely suspended polymerization catalyst suspension contains hydroxy cellulose or polyvinyl pyrrolidone.

4. The process of preparing styrenic polymer particles as claimed in claim 1 wherein said aqueous solution used to form said finely suspended polymerization catalyst suspension contains hydroxy cellulose.

5. The process of preparing styrenic polymer particles as claimed in claim 1, wherein said polymerization catalyst solution comprises 100% by weight of the polymerization catalyst solution and said monomer solution comprises 0% by weight of the suspension polymerization catalyst.

6. The process of preparing styrenic polymer particles as claimed in claim 1, wherein said styrenic polymer particles having particle sizes of a definite particle size range satisfy the relationship $1 < n \leq 3$, wherein the particle size of the larger particles is designated $d_{max}$ and the particle size of the smaller particles is designated $d_{min}$, and $d_{max} = d \times d_{min}$.

7. The process of preparing styrenic polymer particles as claimed in claim 1, wherein the monomer is added to the system in an amount such that the amount of monomer at no time exceeds 35% by weight of the total amount of polymer(s) (including polymer(s) converted from monomer(s)) and monomer(s) in the dispersion system.

8. The process of preparing styrenic polymer particles as claimed in claim 1, wherein the rate of the monomer absorbed in particles for conversion into polymer is equal to or smaller than the rate of the monomer added.

9. The process of preparing styrenic polymer particles as claimed in claim 1, wherein the monomer is added at a time period exceeding 2 hours.

10. The process of preparing styrenic polymer particles as claimed in claim 1, wherein the addition of the monomer is conducted over a period of 1 to 2 hours.

11. The process of preparing styrenic polymer particles as claimed in claim 1, wherein said emulsifying agent is a water-soluble anionic surface active agent or a nonionic surface active agent.

12. The process of preparing styrenic polymer particles as claimed in claim 1, wherein said emulsifying agent is used in an amount of about 0.01 to about 1% based of the amount of water in the system.

13. The process of claim 1 wherein the foaming agent has a boiling point lower than the softening point of the styrenic polymer produced and which is in the gaseous state or liquid state at normal conditions.

14. The process of claim 1 wherein the foaming agent is an aliphatic hydrocarbon, a cycloalaphatic hydrocarbon or a halogenated hydrocarbon.

* * * * *